J. FLYNN.
POTATO PICKER.
APPLICATION FILED MAR. 28, 1914.

1,138,371.

Patented May 4, 1915.

WITNESSES
M. R. McInnis
G. E. Sorensen

INVENTOR
JAMES FLYNN
BY Paul & Paul
ATTORNEYS

UNITED STATES PATENT OFFICE.

JAMES FLYNN, OF ROGERS, MINNESOTA.

POTATO-PICKER.

1,138,371. Specification of Letters Patent. Patented May 4, 1915.

Application filed March 28, 1914. Serial No. 827,887.

*To all whom it may concern:*

Be it known that I, JAMES FLYNN, citizen of the United States, resident of Rogers, county of Hennepin, State of Minnesota, have invented certain new and useful Improvements in Potato-Pickers, of which the following is a specification.

The object of my invention is to provide an implement adapted to be carried in the hand by means of which a person can gather up a quantity of potatoes lying on the ground, shake the dirt therefrom, if necessary, and deposit them in a basket or other receptacle without the necessity of stooping.

A further object is to provide a device for picking up potatoes which will enable a person to gather them with greater ease and much faster than when the potatoes are picked up from the ground with the fingers.

Other objects of the invention will appear from the following detailed description.

The invention consists generally in various constructions and combinations, all as hereinafter described and particularly pointed out in the claims.

Figures 1, 2:
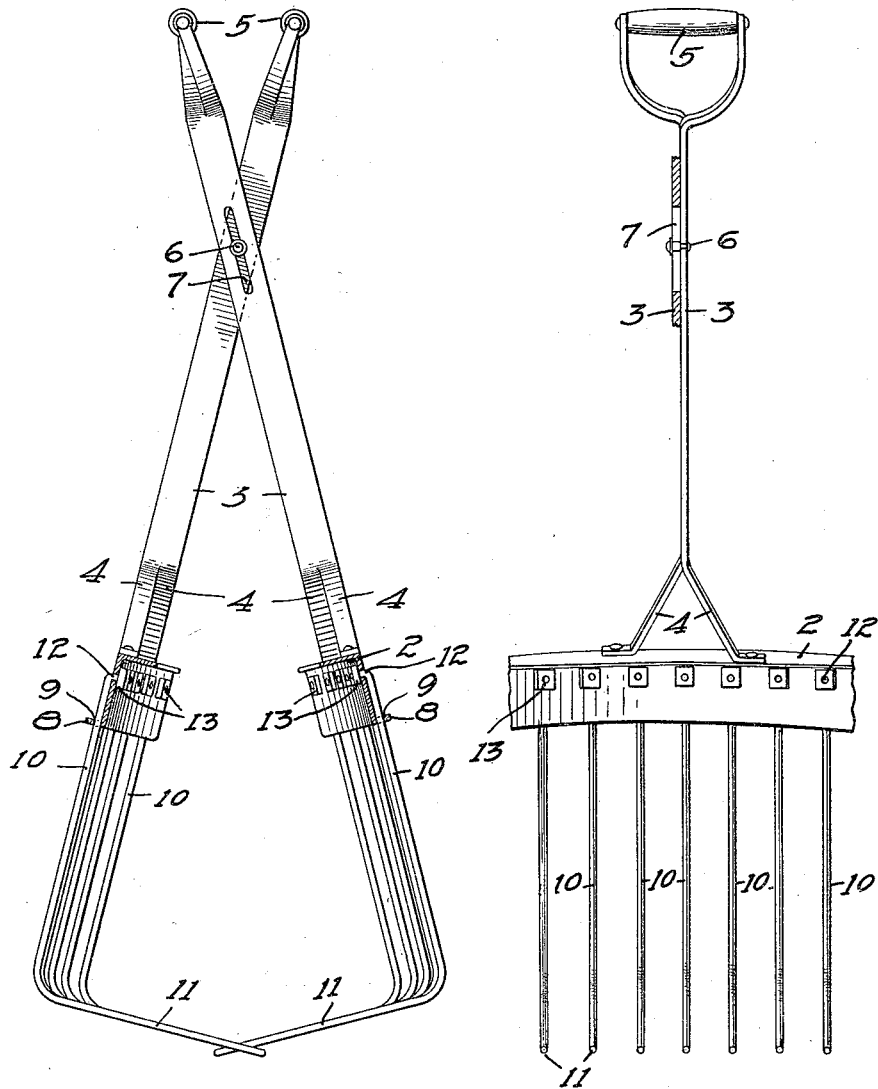
Figure 3:
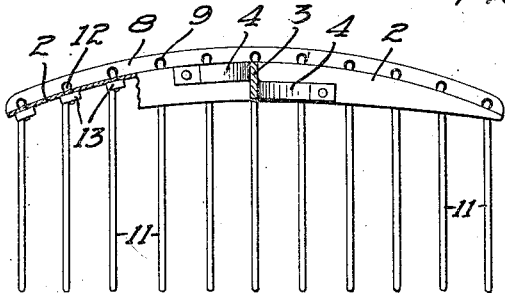

In the accompanying drawings forming part of this specification, Figure 1 is an end view of a potato picker embodying my invention, Fig. 2 is a side view of the same, Fig. 3 is a detail view of one of the pick up forks.

In the drawing, 2 represents a head, made preferably of angle bar metal, and curved slightly, as indicated in Fig. 3. There are two of these heads, each having a horizontal and a vertical flange and each having a shank 3 provided with straps 4 at the bottom, which are secured by rivets or other suitable means to the horizontal flanges of the head.

Each shank has a hand grip 5 and one shank has a bolt 6 mounted therein and passing through a longitudinal slot 7 in the other shank to allow a relative longitudinal movement of the shanks.

Each head 2 has a flange 8 at its lower edge provided with holes 9 therein to receive the shanks of pick up tines or teeth 10, the lower ends 11 of said tines being inwardly turned at right angles substantially to their upper portions. The upper ends of the tines are inwardly turned at 12 and pass through holes in the heads and are locked therein by suitable nuts 13. These may be removed whenever desired to allow a tine to be taken out of the head for repairs or for substitution.

The shanks 3 are of sufficient length so that a person standing in a slightly stooping position can rest the ends 11 of the tines upon the ground and spread the tines of the opposite heads apart a sufficient distance to straddle the potatoes as they lie on the ground after digging. Then whenever the handles are brought together the tines will pass through the soil under the potatoes and upon lifting the device, the potatoes will be raised with them and by moving one shank endwise upon another the potatoes so gathered up can be agitated sufficiently to dislodge the dirt clinging thereto. When this has been done the potatoes may be deposited in a basket or other receptacle and the operation described repeated.

The device may be made of suitable material, there may be any desired number of tines and preferably these tines are spaced apart a sufficient distance to allow the small, unmarketable potatoes to drop between them, while gathering up all those suitable for use or sale. The tines may be mounted in the heads in various ways, and the details of construction may be modified and still be within the scope of my invention.

I claim as my invention:

1. A potato picker comprising shanks having handles thereon, heads mounted on said shanks and tines carried by said heads and adapted to engage and lift the potatoes from the ground when said shanks are raised, said shanks having a connection between them allowing relative longitudinal movement, whereby the potatoes carried by the tines of said shanks can be agitated to dislodge the dirt therefrom.

2. A potato picker comprising shanks having handles thereon, said shanks having a pin and slot connection for relative longitudinal movement, heads mounted on said shanks and tines carried by said heads and adapted to engage and lift the potatoes from the ground, when said shanks are raised, the longitudinal movement of one shank with respect to the other shaking the potatoes on said tines to dislodge the dirt therefrom.

In witness whereof, I have hereunto set my hand this 20th day of March 1914.

JAMES FLYNN.

Witnesses:
ANDREW DEHN,
W. W. HENNING.